Patented May 23, 1939

2,159,594

UNITED STATES PATENT OFFICE 2,159,594

ESTERS OF CYCLIC ALCOHOL

Lucas P. Kyrides, Webster Groves, Mo., assignor to Monsanto Chemical Company, St. Louis, Mo., a corporation of Delaware No Drawing. Application November 1, 1935, Serial No. 47,811

9 Claims. (Cl. 260—475)

The present invention relates to hydrogenated derivatives of polynuclear compounds. It is a continuation in part of co-pending application Serial No. 654,888 filed February 2, 1933, which has issued as Patent No. 2,035,270.

The objects of the invention are to provide a novel class of organic compounds obtained by condensation of a phenol with an alkyl substituted benzene and subsequent hydrogenation of the resultant product. It is another object of the invention to provide compounds possessing relatively high boiling points, a high degree of stability against discoloration by light and heat, high resistance in cellulosic films to permeation by water, high compatibility with cellulosic compositions and the ability to plasticize and soften the latter compositions without unduly impairing the tensile strength thereof. These and other objects will be apparent from consideration of the following specification and the appended claims.

Various plastic compositions including nitrocellulose, alkyd resins and the like, which are employed in the preparation of films, lacquers, filaments, and molding compositions, are commonly admixed with high boiling organic modifiers for purposes of imparting plasticity, flexibility and extensibility thereto. Among the compounds heretofore commonly used as modifiers of plastic materials are camphor, dibutyl phthalate, tricresyl phosphate and dimethyl phthalate.

Heretofore a large number of other products have been proposed but due to the exacting requirements regarding compatibility, light stability, water resistance and particularly low cost, few, other than those mentioned, have enjoyed commercial use. Tricresyl phosphate leaves much to be desired as regards light stability, particularly when the ultimate product is utilized in a transparent or white pigmented coating composition that is exposed in the course of its normal use to actinic rays, such as occur in ordinary sunlight.

It has now been discovered that a novel class of esters of highly valuable properties as plasticizers can be prepared by reacting a hydrogenated benzyl phenol with a carboxylic acid. Among the desirable characteristics of such esters are high boiling point, low melting point, great stability to heat, light and chemical agencies and a compatibility with nitrocellulose and its solvents rendering them eminently suitable for plasticization thereof.

In general, the hydrogenated reaction products (as well as their ketone and ester derivatives) of unsubstituted benzyl chloride or benzal chloride with phenols are preferred. Similarly, the phenols preferred are unsubstituted hydroxy benzenes including, however, the alkyl substituted hydroxy benzenes, such as cresol and xylenol that are otherwise unsubstituted.

A method of preparing compositions contemplated by the present invention is hereinafter set forth, it being understood that the invention is not limited to any particular method of procedure or synthesis. For this purpose benzyl phenol and its derivatives will be used as an example. It is prepared conveniently by heating benzyl chloride with an excess of phenol. A catalyst such as $ZnCl_2$ may be used but is not necessary. Hydrogen chloride is liberated in accordance with the following equations:

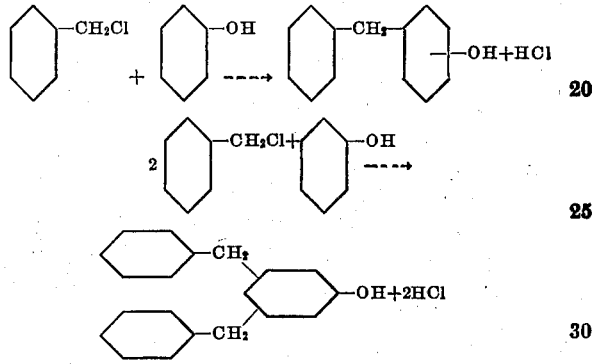

The use of an excess of phenol retards the dibenzyl phenol formation.

The resulting mixture of the mono and di substituted phenolic products may be fractionated, preferably in vacuum, to separate the mono substituted product if desired. However, the mixture may be utilized directly.

Hydrogenation of the mixture is effected advantageously by subjecting the benzyl phenol or mixture of benzyl phenol and dibenzyl phenol to hydrogen in the presence of a hydrogenating catalyst such as nickel. The reaction proceeds smoothly at a temperature of 200°–220° C. and a hydrogen pressure of 50–100 atmospheres. The method of preparing the hydrogenation catalyst may follow that commonly employed in the preparation of other hydrogenating catalysts as is well understood by those skilled in this art.

After the consumption of hydrogen has subsided, the reaction mixture, consisting essentially of the hydrogenated benzyl phenols, is separated from the catalytic composition and fractionated.

In the event the ketone is desired it may be formed conveniently by releasing the hydrogen after the consumption of hydrogen has subsided whereby the catalyst functions to dehydrogenate the product thereby converting it into the hydrogenated ketone in accordance with the following equation:

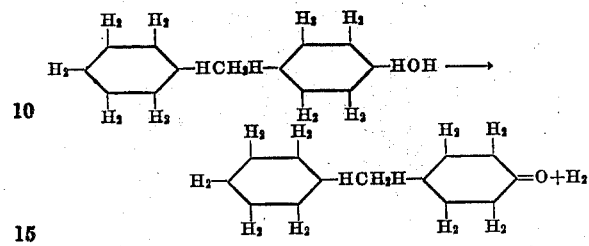

The reaction proceeds smoothly at 200°–250° C. Obviously, the precise temperature and pressure conditions as well as the time of reaction varies with the nature and activity of the catalyst.

The ketone from the hydrogenated benzyl phenol is then separated from the catalyst and purified by distillation or in any other suitable manner.

The esters of the hydrogenated benzyl phenols and dibenzyl phenols are made conveniently by reacting the hydrogenated phenols with an acid or an acid anhydride.

A desirable class of ester compositions consists of the mixed esters of dicarboxylic acids, which are made by reacting molar quantities of a dicarboxylic acid anhydride such as phthalic anhydride or succinic anhydride and the hydrogenated benzyl phenol in accordance with the following equation:

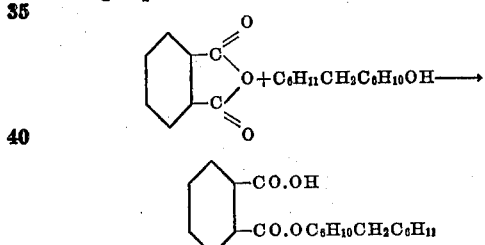

The half acid ester so produced may be reacted with an additional molar quantity of the same or another hydrogenated benzyl phenol or may be reacted with a molar quantity of another alcohol, for example, methyl, ethyl, propyl or butyl alcohol. In lieu of the simple alkyl alcohols a mono alkyl ether of ethylene glycol, an ester of glycolic (hydroxyacetic) acid, cyclohexanol or benzyl alcohol may be substituted whereby a mixed neutral ester of the dicarboxylic acid is obtained. Sodium salts of mono esters of hydrogenated benzyl phenol and such dicarboxylic acids as muconic and maleic acid, succinic acid, adipic acid, sebacic acid and phthalic acid may also be reacted with methyl, ethyl or butyl, or other stable esters of chloracetic acid to form mixed esters having high boiling points and the property of plasticizing cellulose nitrate and the like, as described herein.

The condensation described in the foregoing example between benzyl chloride and phenol results in a preponderance of mono benzyl phenol. If the di substituted product is desired, the yield thereof may be increased by reducing the excess of phenol in the reaction mixture.

In lieu of phenol, as provided in the foregoing example, one may substitute alkyl substituted hydroxy benzenes such as a cresol, resorcinol or a xylenol in which case the corresponding condensation product of benzyl chloride and the particular phenol is obtained. The corresponding hydrogenation product is prepared in an analogous manner. The esterification of the hydrogenated product, as well as the ketone formation, may follow in general the procedure set forth in connection with the benzyl phenol hydrogenation product.

By substituting benzal chloride for the benzyl chloride in the foregoing examples and at the same time doubling the quantity of the phenol employed one obtains the benzylidene diphenol (dihydroxy triphenyl methane) in accordance with the following reaction:

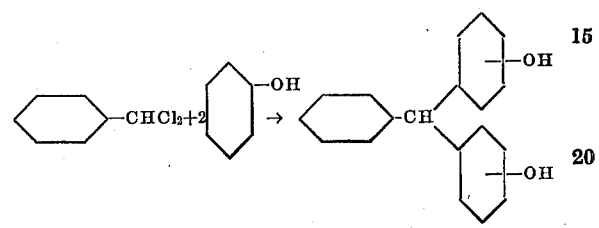

In general the benzal chloride condensation products are higher boiling than the benzyl chloride condensation products and purification by means other than distillation, as, for example, crystallization, may be resorted to as is well understood by those skilled in the art. These products may be hydrogenated to cyclohexyl-di (cyclohexanol)-methanes and the latter dehydrogenated to cyclohexyl-di-(cyclohexanon)-methanes in a manner similar to that described hereinabove.

The hydrogenation of the benzyl phenol composition referred to hereinabove contemplates saturation of the benzyl group as well as the phenol nucleus (or nuclei as the case may be). Total saturation (or hydrogenation) is, however, unnecessary and one may, if desired, interrupt the hydrogenation preferably after the phenol group has been hydrogenated but before the benzyl group has reacted substantially, if at all. This results in a benzyl substituted cyclohexanol which, in case the benzyl phenol is the raw material, produces benzyl cyclohexanol (C₆H₅CH₂C₆H₁₀OH).

Obviously the hydrogenation may be interrupted at intermediate stages, if desired. In general, compositions wherein the phenol group is saturated are preferred. In like manner the partially hydrogenated benzylidene phenol may be formed and converted into ketones and esters.

The foregoing partially hydrogenated compositions, as well as their esters and ketones, may be substituted for the corresponding completely saturated (hydrogenated) compounds prescribed in the subsequent examples.

The compositions described in the foregoing description are utilized in a manner analogous to that employed in connection with the use of dibutyl phthalate or camphor in the case of nitrocellulose compositions.

The monohydroxy, as well as dihydroxy, alcohols resulting from the hydrogenation of the foregoing phenols may be utilized advantageously as modifying agents in the preparation of alkyd type resins wherein they displace glycerol in part. The ketones produced condense with aldehydes to form valuable resins having properties similar to those obtained by the condensation of cyclohexanone with aldehydes as, for example, formaldehyde.

The application of the new compounds as plasticizers in cellulosic compositions is illustrated by the following examples:

*Example I.*—Sufficient nitrocellulose is dissolved in a mixture of approximately equal parts by volume of butyl acetate and toluol to produce a solution of consistency which may be desired and which will flow and form into a uniform film. Incorporate in this mixture 25% of the weight of the nitro cellulose of hexahydrobenzyl cyclohexanol (B. P. 155°/14 mm.), the hydrogenated benzyl phenol ($C_6H_{11}CH_2C_6H_{10}OH$). Spread the solution on a smooth surface to form a uniform layer and permit the butyl acetate-toluol solvent to evaporate slowly. The resulting film will be found to be tough, flexible and remarkably resistant to permeation of water or moisture. Thus, as compared to a nitro cellulose film containing no plasticizer, the decrease in moisture permeability is 60% whereas the decrease in the case of a film plasticized with dibutyl phthalate is 30% or even less.

Upon exposure to a quartz light, such as is employed in obtaining light fastness data, results obtained indicate that the life, as concerns color, of a film containing 50% by weight of the hydrogenated benzyl phenol is prolonged by 400% as compared to a similar film containing dibutyl phthalate. Tricresyl phosphate containing films are even less resistant than those plasticized with dibutyl phthalate.

*Example II.*—Substitute the acetic acid ester for the hydrogenated benzyl phenol provided in the previous example. The characteristics of the film produced are much the same as those of films made from the unesterified material. The ester has the advantage of lack of odor; moreover, it has a perceptible gelatinizing action on nitro cellulose which is indicative of marked solvent power.

*Example III.*—Substitute hexahydrobenzyl cyclohexanone (B. P. 155° at 14 mm.), the ketone of the hydrogenated benzyl phenol for the hydrogenated benzyl phenol of Example I. The water resistance and compatibility are excellent; moreover, the gelatinizing action is even more pronounced than in the case of the ester.

*Example IV.*—In lieu of the acetic acid ester of Example II substitute the benzoic acid ester.

*Example V.*—In lieu of the hydrogenated benzyl phenol in Example I substitute the hydrogenated mixture of benzyl phenol and dibenzyl phenol or the hydrogenated benzyl cresol.

*Example VI.*—Hexahydrobenzylidene dicyclohexanol, the hydrogenated benzylidene diphenol (di-hydroxy-triphenyl methane) is substituted for the hydrogenated benzyl phenol of Example I.

*Example VII.*—Substitute an equal weight of the acetic acid ester of a hydrogenated benzyl cresol for the hydrogenated benzyl phenol of Example I.

In lieu of the toluol-butyl acetate solvent one may substitute a composite solvent embodying a wide variety of relatively low boiling compositions as is well understood by those skilled in the art. One such composite solvent may consist of a mixture which contains the following ratio of ingredients:

25% active solvent such as ethyl acetate, butyl acetate, etc.
20% alcohol such as denatured alcohol, butyl alcohol, etc.
55% hydrocarbon such as benzol, toluol, etc.

Similarly, one may add gums and resins of natural or synthetic origin, examples of which are shellac and alkyd resins respectively. Obviously, pigments and dyes may be employed if desired.

From the foregoing description it will be evident that I have provided a novel class of organic compounds for use as camphor substitutes which impart an inordinate degree of light fastness, water resistance and impermeability to nitrocellulose.

These compounds may be represented structurally as: $RCH_2X$ where $RCH_2$ is a benzyl or hydrogenated benzyl radical and X is a hydrogenated aryl radical embodying a hydroxyl group, a ketone group or an ester group. Alternatively, the compositions may take the form: $(RCH_2)_2X$ in which case the hydrogenated hydroxylated aryl radical X has two benzyl or hydrogenated benzyl radicals joined thereto; or the composition may take the form: $RCHX_2$ wherein RCH is a benzylidene or hydrogenated benzylidene group and X represents a hydrogenated hydroxylated aryl radical.

Obviously other methods of preparing the plasticizing compositions may be employed without departing from the scope of this invention.

In the claims the expression "hydrogenated reaction product" contemplates partially, as well as completely, hydrogenated (saturated) products.

Although only the preferred embodiments of the invention have been shown and described, these are merely given by way of example and it will be apparent to those skilled in the art that numerous modifications may be made therein without departure from the spirit of the invention or the scope of the appended claims.

What I claim is:

1. A neutral dicarboxylic acid ester in which one carboxyl group of the dicarboxylic acid has been esterified by an alcohol resulting from the hydrogenation of a condensation product of a phenol with a material selected from the group consisting of benzyl chloride and benzal chloride and the other carboxyl group of the dicarboxylic acid has been esterified by a hydroxy compound selected from the group consisting of monohydric alcohols, polyhydric alcohol ethers having one free hydroxyl group, esters of hydroxy carboxylic acids and alcohols resulting from the hydrogenation of condensation products of monohydric phenols with a material selected from the group consisting of benzyl chloride and benzal chloride.

2. A neutral phthalic acid ester in which one carboxyl group of the phthalic acid has been esterified by an alcohol resulting from the hydrogenation of a condensation product of a phenol with a material selected from the group consisting of benzyl chloride and benzal chloride and the other carboxyl group of the phthalic acid has been esterified by a hydroxy compound selected from the group consisting of monohydric alcohols, polyhydric alcohol ethers having one free hydroxyl group, esters of hydroxy carboxylic acids and alcohols resulting from the hydrogenation of condensation products of monohydric phenols with a material selected from the group consisting of benzyl chloride and benzal chloride.

3. A neutral dicarboxylic acid ester of the general formula

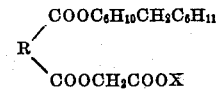

in which R is a hydrocarbon radical and X is an alkyl radical.

4. A neutral phthalic acid ester in which at least one carboxyl group of the phthalic acid has been esterified by an alcohol resulting from the hydrogenation of a condensation product of a monohydric phenol with a material selected from the group consisting of benzyl chloride and benzal chloride and any remaining carboxy group of the phthalic acid has been esterified by a monohydric alcohol.

5. A neutral phthalic acid ester in which at least one carboxyl group of the phthalic acid has been esterified by an alcohol resulting from the hydrogenation of a condensation product of a monohydric phenol with benzal chloride and any remaining carboxyl group of the phthalic acid has been esterified by a monohydric alcohol.

6. A neutral phthalic acid ester in which at least one carboxyl group of the phthalic acid has been esterified by an alcohol resulting from the hydrogenation of a condensation product of a monohydric phenol with benzyl chloride and any remaining carboxyl group of the phthalic acid has been esterified by a monohydric alcohol.

7. A mixed neutral phthalic acid ester in which one of the carboxyl groups of the phthalic acid has been esterified by a monohydric alcohol and the other carboxyl group of the phthalic acid has been esterified by hexahydrobenzyl cyclohexanol.

8. A mixed neutral phthalic acid ester in which one of the carboxyl groups of the phthalic acid has been esterified by a monohydric alcohol and the other carboxyl group of the phthalic acid has been esterified by a hydrogenated benzyl phenol.

9. A neutral phthalic acid ester of the general formula

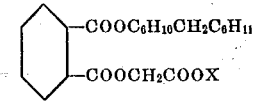

in which X is an alkyl radical.

LUCAS P. KYRIDES.